April 5, 1932.   P. DE MATTIA   1,852,557
VULCANIZING MOLD
Filed Jan. 10, 1927   4 Sheets-Sheet 2

INVENTOR
BY
ATTORNEYS

April 5, 1932. P. DE MATTIA 1,852,557
VULCANIZING MOLD
Filed Jan. 10, 1927 4 Sheets-Sheet 3
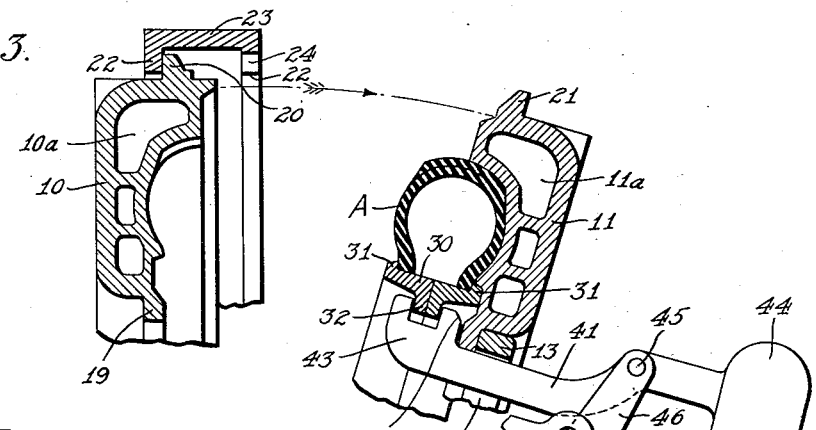
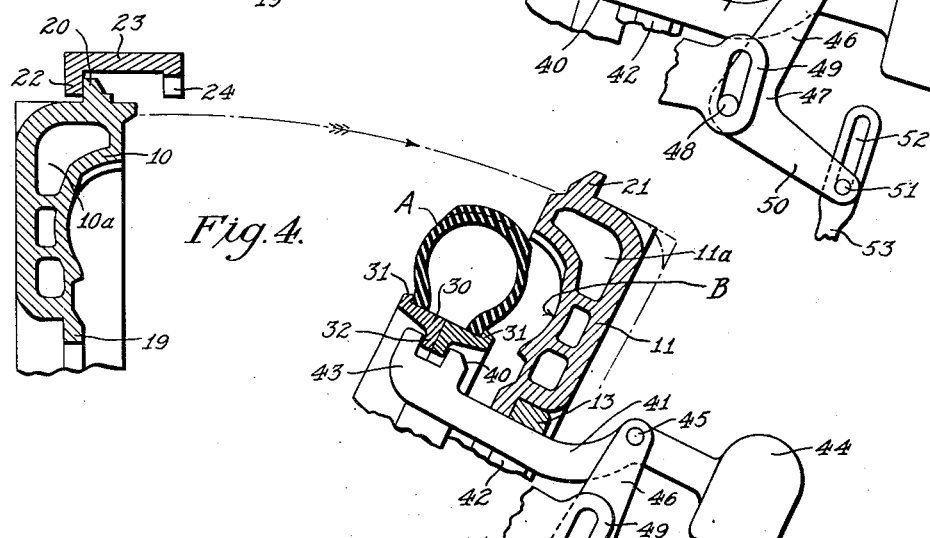
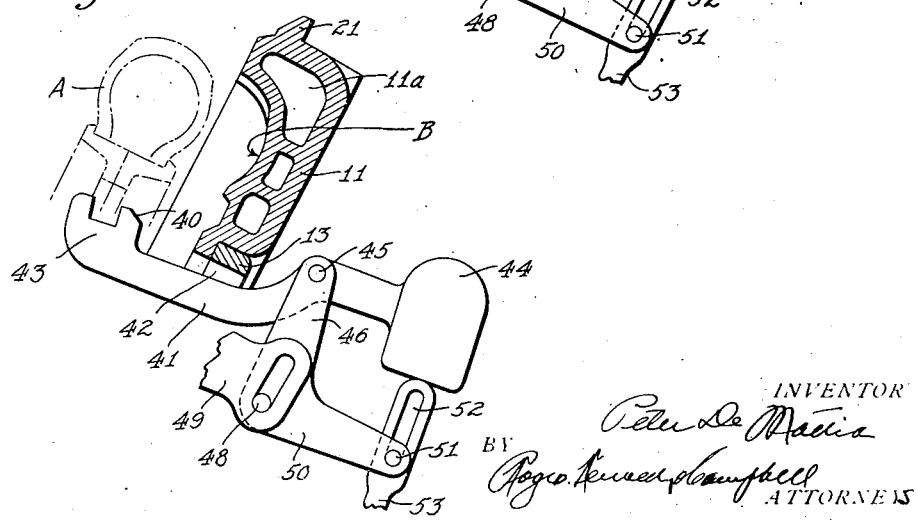

April 5, 1932.　　　P. DE MATTIA　　　1,852,557
VULCANIZING MOLD
Filed Jan. 10, 1927　　　4 Sheets-Sheet 4
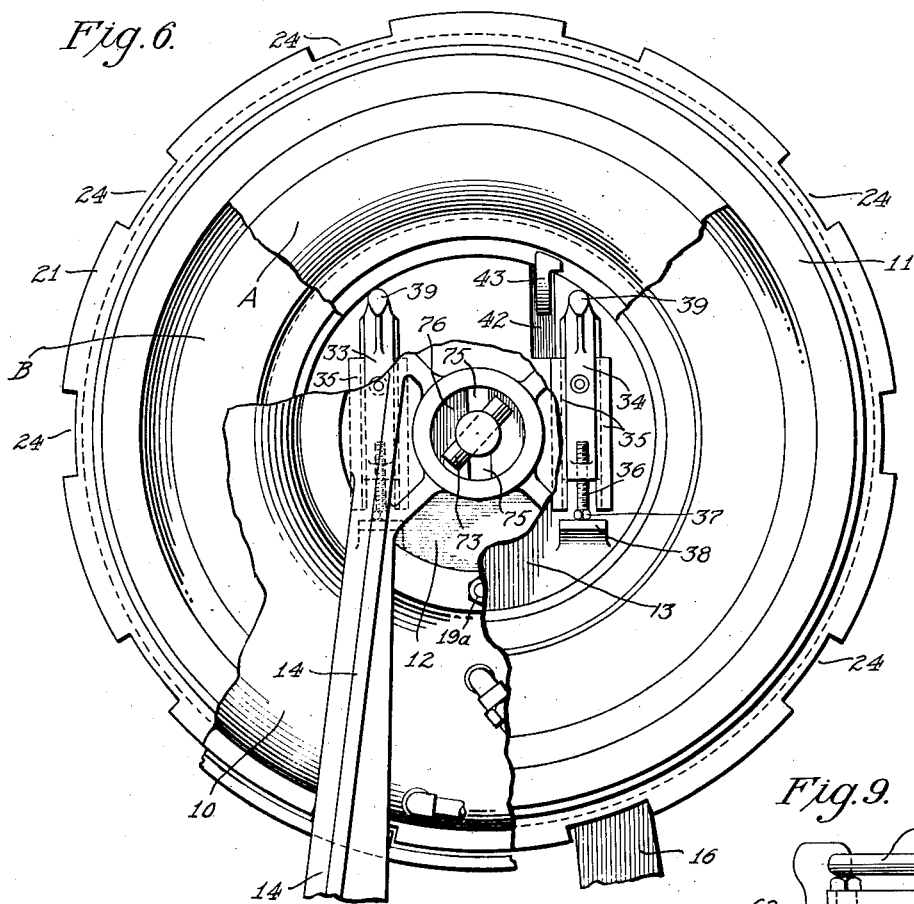
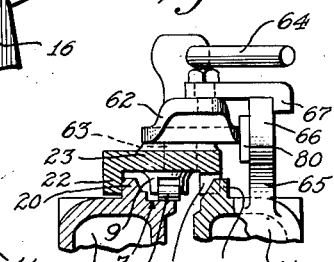
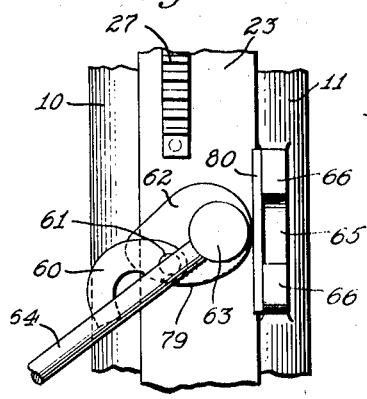
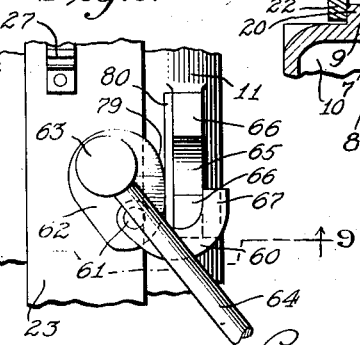

Patented Apr. 5, 1932

1,852,557

UNITED STATES PATENT OFFICE

PETER DE MATTIA, OF PASSAIC, NEW JERSEY, ASSIGNOR, BY MESNE ASSIGNMENTS, TO NATIONAL RUBBER MACHINERY COMPANY, OF AKRON, OHIO, A CORPORATION OF OHIO

VULCANIZING MOLD

Application filed January 10, 1927. Serial No. 160,173.

This invention relates to improvements in vulcanizing molds, and has particular reference to molds of the so-called "book type" for vulcanizing pneumatic tires, inner tubes, and the like.

The general object of the invention is to provide a tire vulcanizing mold which may be opened and closed and the work inserted and removed more readily and rapidly than in the case of prior vulcanizing molds.

Heretofore the labor necessary for vulcanizing tires in molds has been costly due to certain difficulties encountered in opening and closing the molds. For example, the tire must first be accurately positioned with reference to the mold cavities, and then considerable force is required to draw the two mold sections together to close the mold tightly before the vulcanizing operation. After the vulcanization is complete, it is difficult to open the mold to remove the work, because of the tendency of the rubber to adhere to the mold surfaces. These opening and closing operations are not only slow, but tax the physical strength of the operators and thus limit the number of molds which can be attended to by each operator.

The present invention overcomes these objectionable features of the prior art, and greatly facilitates and expedites production. One feature of the invention contemplates the provision of a vulcanizing mold with a movable or hinged section equipped with a work stripping mechanism by which the tire or other vulcanized article may be quickly and easily removed from the mold cavities. Another feature resides in the provision of such a work stripping mechanism which contributes to easy opening of the mold after vulcanization by automatically stripping the vulcanized tire first from one mold section and then from the other during the opening movement. According to another feature, to facilitate the closing of the mold, mechanical means with substantial leverage is provided for actuating the movable mold section to draw the two sections together, after which they may be locked in closed relationship by a rotatable locking member which is mounted on one of the mold sections and engageable with the other mold section. A further feature consists in the provision of a central clamping device to supplement the action of the rotatable locking member and to equalize the stresses in the mold sections when locked, said central clamping devices also assisting in the final closing of the mold. The mold actuating means also includes means for "breaking" or initially separating the mold sections to open the mold after vulcanization, such means in one form of the invention comprising a cam or eccentric mounted on one of the mold sections and adapted to engage a portion of the other section. These and other features will be more fully discussed later on.

The invention will be readily apparent from the following description, when taken in connection with the accompanying drawings, wherein one embodiment is shown by way of illustration, and wherein Fig. 1 is a front elevation of the improved tire vulcanizing mold;

Figs. 3, 4 and 5 are similar fragmentary transverse sectional views through the mold section, showing three stages in the opening movements of the mold and in the operation of the stripping mechanism;

Fig. 6 is a rear elevation of the mold proper, partly broken away to show internal features;

Fig. 7 is a fragmentary top plan view of the mold actuating means, showing the parts in closed position;

Fig. 8 is a similar view showing the parts in position for effecting the final closing of the mold; and Fig. 9 is a fragmentary sectional view on the line 9—9 of Fig. 8.

Figure 1:
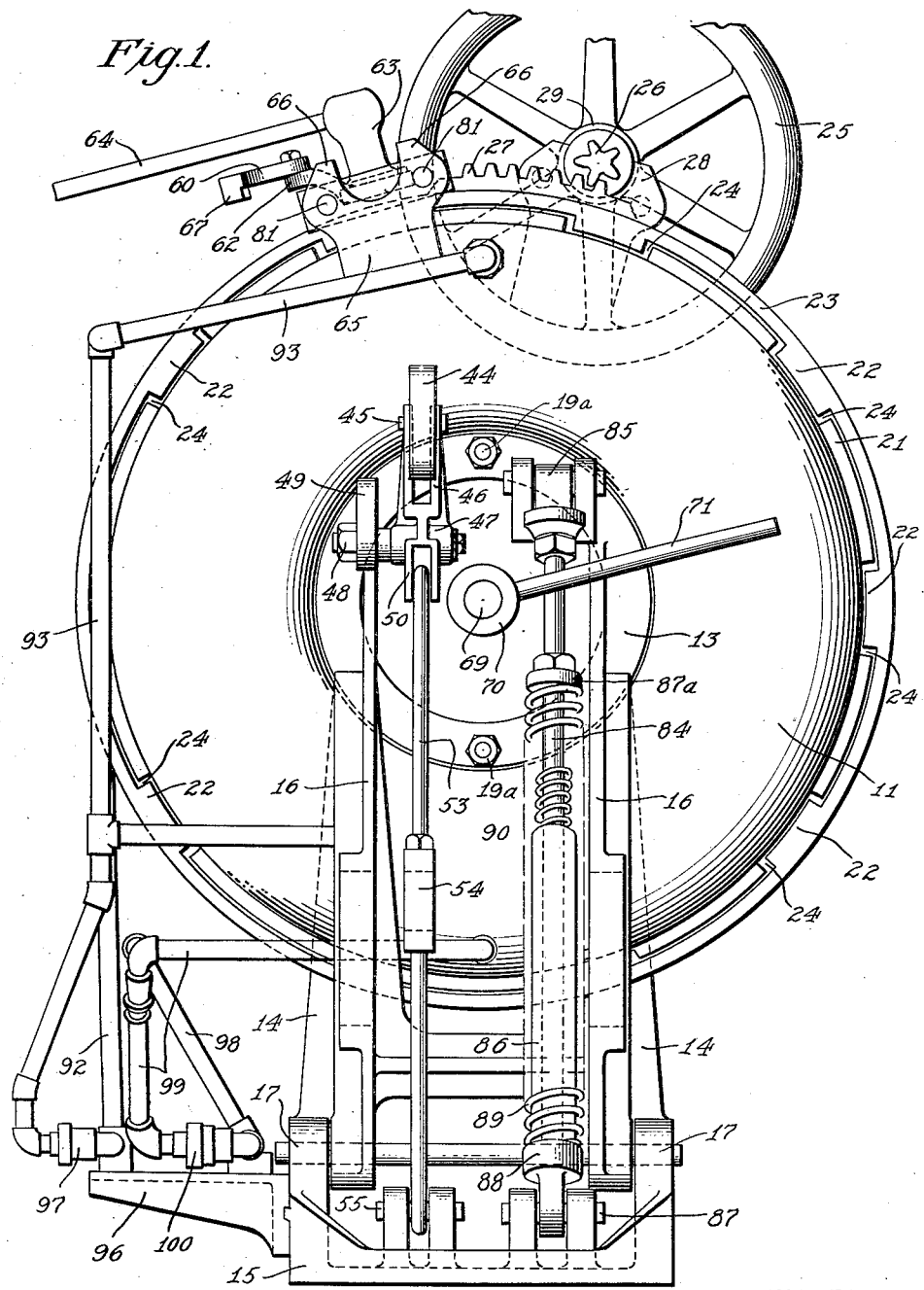

The improved tire vulcanizing mold comprises a pair of complementary mold sections 10 and 11, jacketed in the usual manner to provide steam heating chambers 10ª and 11ª, and said sections being respectively mounted on central supporting members 12 and 13 in the form of circular plates. The member 12 is held in fixed position by a pair of posts 14 which extend upwardly from a base 15, while the member 13 is carried by a pair of swinging arms 16 which are pivoted to the base at 17 below the mold. An angular offset 18 at the lower portion of each arm 16 is so proportioned as to place the center of gravity of the swinging mold section 11 close to the pivotal center 17, rendering said arms 16 and their associated parts capable of easy movement in opening and closing the mold. The mold sections 10 and 11 are preferably detachable from the supporting members 12 and 13, whereby molds of different sizes or different tread designs may be interchanged in a single machine frame, each mold section being provided with an inwardly extending flange 19 of standardized proportions to fit upon annular seats 12$^a$ or 13$^a$ adjacent the peripheries of the supporting plates 12 and 13, and being fastened thereto by studs or bolts 19$^a$.

In order to hold the mold closed, the mold sections 10 and 11 are provided with peripheral flanges 20 and 21 respectively, which are straddled by spaced radial lugs 22 of a locking ring 23, said locking ring being rotatable on the fixed mold section 10. The flanges 20 and 21 are provided with a plurality of spaced radial slots 24 corresponding in number with the lugs 22 of the locking ring, the slots of the flange 20 being out of alignment with the slots in flange 21, to facilitate assembly of the ring on the fixed mold section. When the ring 23 is rotated, said lugs may be brought into registration with the radial slots 24 of flange 21 to permit movement of the mold section 11 with reference to the section 10, and in this condition the ring 23 will be maintained on the fixed mold section by virtue of the fact that the slots 24 of the flanges 20 and 21 are out of alignment. The inner surfaces of the lugs 22, or the outer surfaces of the flanges 20 and 21, or both, are slightly beveled or wedge-shaped to render the same easily engageable and to firmly clamp the mold sections in locked relation. On its inner periphery, and between the opposed lugs 22, the ring 23 is provided with a flange 9 which forms a supporting race for a plurality of anti-friction rollers 8, said rollers engaging a cylindrical surface 7 on the fixed mold section 10. The locking ring may be rotated by actuation of a hand wheel 25 which turns a pinion 26 meshing with a gear segment 27 which is carried by the locking ring. The pinion 26 is mounted on one end of a shaft 26$^a$ which is journaled in a bracket 28 secured to the fixed mold section 10. The other end of the shaft carries a shouldered coupling 29 and the hand wheel 25, said hand wheel having a cooperating shouldered coupling 29$^a$ and capable of partial rotation with reference to the shaft and member 29. Thus there is a substantial back-lash or lost motion between the hand wheel and the pinion 26, whereby it is possible to obtain a "hammer-blow" effect in rotating the ring 23 to draw the mold sections together with the required pressure.

The tire A, to be vulcanized, containing the usual expansible core or air bag (not shown), is mounted on a divided or two-part supporting rim 30 of customary form, and having side flanges 31 for confining the beads of the tires, and a central inwardly extending annular rib 32. The side flanges 31 are snugly seated in the mold sections when the mold is closed, and in order to facilitate the accurate positioning of the tire and curing rim relative to the mold cavities, a pair of supporting brackets 33 and 34, Fig. 6, are mounted on the inner side of the member 13 and at opposite sides of the vertical center of the mold. The brackets 33 and 34 are longitudinally movable in dovetail guides 35, their adjustment being accomplished by turning set screws 36 whose heads 37 rest upon shelves 38. At their upper ends, each of the brackets 33 and 34 is provided with a laterally extending arm 39 upon which the annular flange 32 of the curing rim is adapted to rest. Thus, the tire A and rim 30 can be quickly applied to the mold by suspending the rim upon the arms 39, which substantially align the axis of the tire with that of the mold cavities in an expeditious manner. Being adjustable, the arms 39 may be set in position to accommodate tires of different sizes or diameters.

Figure 2:
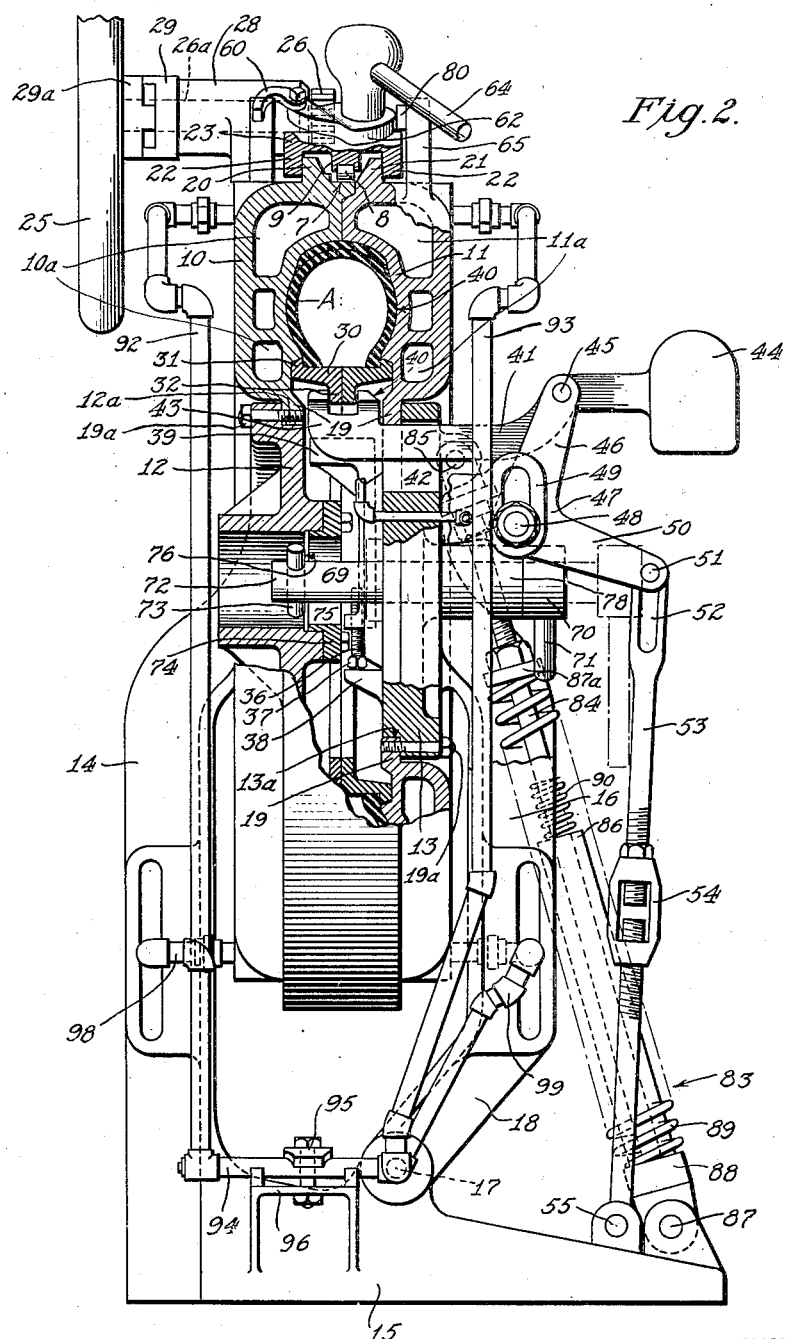
Fig. 2 is a side elevation thereof, partly broken away and partly in section, and showing the mold sections in closed position.

Means are provided for stripping the tire A from the cavities of the mold sections, and such stripping action is preferably accomplished automatically as the mold is opened. For this purpose, a lever 41 is freely mounted to extend through a slot 42 in the supporting member 13, said lever 41 having at its inner end an enlarged bifurcated or claw portion 43 which is adapted to engage the annular rib 32 of the supporting rim. The forward upper edge of the claw portion 43 is beveled as at 40 to permit its passing over the rib 32 as the mold is closed, as will hereinafter be apparent. The outer end of the lever 41 is provided with a counterbalance weight 44, and the lever is pivotally connected at 45 intermediate its ends to an arm 46 of a bell-crank 47. The weight 44 is such as to normally swing the lever 41 in a clock-wise direction in Fig. 2, thus forcing the claw portion 43 upwardly against the rim 30. The bell-crank 47 is adjustably pivoted at 48 on a bracket 49 carried by the member 13, and its other arm 50 is connected by a pin 51 with the slotted end 52 of a link 53. The link 53 is adjustable by means of a turn-buckle 54, and is pivoted at 55 to the base 15 of the machine. Adjustment of link 53 and of pivoted center 48 provides for different size molds.

The final closing of the mold requires considerable force in order to properly confine the material in the mold cavities, and mechanical means are therefore provided to draw the two mold sections together. Such means comprises a hook 60 which is pivoted at 61 to an eccentric or cam 62, said cam being rotatably mounted on a post 63 on the upper side of the locking ring 23, and rotatable by means of a handle 64 of substantial length. The movable mold section 11 is provided with a lug 65 having a pair of upwardly extending ears 66, adjacent which the cam 62 is adapted to be positioned when the locking ring 23 is in its unlocked position, as shown in Fig. 1. In this condition, the hook 60 may be swung as shown in Figs. 8 and 9, so that its offset extremity 67 engages one of the ears 66, and then a clock-wise movement of the handle 64 and cam 62 results in positively drawing the mold section 11 toward the mold section 10, to a position permitting rotation of the ring to locking position.

In order to supplement the action of the locking ring 23 and to equalize the stresses within the mold, a central locking means is provided in the form of a rod 69 which is rotatably and slidably mounted in the center of the supporting member 13 of the movable mold section. At its outer end, the rod 69 is fitted with a collar 70 and a handle 71, while adjacent its inner end 72 it carries a transverse pin 73 which projects at opposite sides of the rod 69. When the mold is closed, the rod 69 may be moved inwardly so that its end 72 extends through a bearing plate 74 which is secured to the inner side of the stationary member 12, said bearing plate being provided with diametrically opposed slots 75 permitting the passage of the pin 73. After the rod 69 has been thus inserted, it may be rotated so that the pin 73 will be out of registration with the slots 75. The front surface 76 of the bearing plate is formed at opposite sides of the slots 75 with inclined or cam surfaces which are adapted to be engaged by the pin 73 when the latter is rotated and communicate a longitudinal movement to the rod 69. This movement will be transmitted to the mold section 11 by virtue of the abutment of collar 70 with the end of the bearing boss 78.

After the vulcanizing operation has been completed, the rubber tends to adhere to the mold cavities, and means are therefore employed for "breaking" the mold. To this end, the eccentric or cam 62 has an operative edge 79 adapted to abut against a wearing plate 80 which is secured by rivets 81 or the like to the upstanding ears 66. The position of the cam 62 when the mold is closed is shown in Fig. 7, and it will be evident that as the handle 64 is turned in a counterclockwise direction, e. g., to the position shown in Fig. 8, the rise of the cam edge 79 will force the mold section 11 away from the section 10.

In view of the fact that the mold is upright, and that the movable section swings downwardly, it will be an easy matter for the operator to open and close the mold. The ease of operation may be further augmented by the provision of counterbalancing mechanism 83, which includes a telescopic rod section 84 having its upper end pivoted as at 85 to the member 13, and its lower end slidably received within a tubular member 86, which in turn is pivoted at 87 to the base of the machine. The telescopically connected portons 84 and 86 are respectively provided with collars 87ª and 88 between which a compression spring 89 is confined. The pivotal center 87 is disposed forwardly of the pivot 17, whereby in opening the mold, the collar 87ª approaches the collar 88, thus gradually increasing the resistance of the spring 89. Surrounding the rod section 84 and resting on the upper end of the tubular member 86 is a smaller coil spring 90 which acts as a buffer, the arrangement being such that as the mold section 11 reaches a predetermined point in its opening movement, the collar 87ª comes in contact with the upper end of said spring 90 and compresses it until its resistance, coupled with that of the spring 89, is sufficient to overcome the weight of the section 11 and its associated parts.

Steam or other heating fluid is supplied to the mold jackets 10ª and 11ª through suitable piping 92 and 93 respectively, rising from a single supply pipe 94 which is anchored at 95 to a supporting bracket 96 on the base 15. The piping 93 includes a swivel joint 97 which is in axial alignment with the pivotal center 17 of the movable mold section. Condensation from within the mold jackets is drained through piping 98 and 99 connected at substantially the lowest points in the jackets, the piping 99 also including a swivel joint 100 in axial alignment with the joint 97 and pivotal center 17. While the jackets have been shown as supplied with heating fluid at only one point and from a single source of supply, they can each be so supplied at a plurality of points from either one or more supply pipes, as is well known to those well skilled in the art.

The operation of the device will be readily understood from the foregoing description, but a brief recapitulation may be helpful. After the tire A has been sufficiently vulcanized, it can be quickly and easily removed from the mold after the latter has been unlocked. This is accomplished by rotating the hand wheel 25 to turn the locking ring 23 to its unlocking position (shown in Fig. 3), the back-lash in the coupling members 29 and 29ª being made use of to effect a "hammer-blow", as previously described, to disengage the lugs 22 from the flange 21. The rod 69 may then be rotated by means of the handle 71 to bring the transverse pin 73 in line with the slot 75, in which condition said rod and handle may be drawn forwardly to the dotted-line position in Fig. 2. Then, by manipulation of the handle 64, the cam 62 (Fig. 7) can be rotated in a counter-clockwise direction to "break" the mold or to move the mold section 11 away from the section 10. In the initial opening movement of the mold section under the action of cam 62, the tire A is stripped from the mold section 10, being maintained within the mold cavity B of the section 11, by virtue of the engagement of the claw portion 43 of lever 41 with the rib 32 of the tire supporting rim 30. As the section 11 moves from its closed position to that shown in Fig. 3, the pin 51 of the bell-crank arm 50 will slide downwardly in the slot 52 of the link 53 and as a result the lever 41 will remain stationary with reference to said section 11. As the opening movement then continues, after the pin reaches the bottom of the slot 52, the bell-crank 47 is relatively moved in a counter-clockwise direction, with the result that the lever 41 is moved longitudinally inward to strip the tire from the mold cavity B. This position is illustrated in Fig. 4, where it will be seen that the bottom of the weight 44 has now come in contact with the upper end of the link 53. A slight additional outward movement of the section 11 results in tilting the lever 41 about its pivot 45, swinging its claw portion 43 downwardly to release the rib 32 of the curing rim (see Fig. 5), whereupon the tire and rim may be easily lifted out of the opened mold. In the meantime, the telescopic rod section 84 has been moving downwardly in the tubular section 86, compressing the spring 89, and the opening movement is finally arrested by the spring buffer 90 after the tire and its supporting rim have been disengaged as above described.

When the mold stands open, the parts of the stripping mechanism are in the positions shown in Fig. 5, with the lever 41 tilted by virtue of the engagement of its weight 44 with the upper end of the link 53. In inserting an unvulcanized tire, it is merely necessary to loosely place the tire and its supporting rim 30 in the movable mold section 11, said tire and rim being guided to their seats by the arms 39. The operator then manually swings the mold section 11 and its associated parts inwardly and upwardly toward the fixed mold section 10, during which movement the beveled corner 40 of the claw portion 43 comes in contact with the rib 32 of the tire supporting rim, tilting the lever slightly to permit said claw portion to become engaged with the rim rib. As the movement of the mold section is continued, the lever 41, by reason of the further endwise movement which is given to it, draws the tire to its seat in the mold section, where it is held during the remainder of the movement of the mold section. As the movable mold section 11 is brought into engagement with the fixed mold section 10, the lever 41, through the engagement of its claw portion 43 with the tire supporting rim, will also aid in seating the tire casing and its supporting rim in the fixed mold section. The final closing and locking of the mold can be accomplished as previously described.

From the foregoing, it will be evident that an improved vulcanizing mold of extreme simplicity has been produced, with which tires may be expeditiously vulcanized with a minimum amount of labor, and that the mold may be easily opened and closed, quickly locked in closed position, and the work will be automatically stripped from the mold cavities as the mold is opened. Obviously, changes may be resorted to in the details of construction and arrangement of parts, and the right is herein reserved to make such changes as fall within the scope of the appended claims, without departing from the spirit of the invention.

Having thus described my invention, what I claim is:

1. A tire vulcanizing mold including, in combination, a relatively fixed mold section, a movable mold section hinged at its lower edge so as to be movable outwardly and downwardly away from the fixed section and inwardly and upwardly into mating relation with said fixed section, a supporting rim for mounting a tire, means carried by the movable mold section for retaining the tire in its seat in the movable section during the initial opening movement of the mold, and means actuated by the movable section for automatically stripping the tire from said seat in the movable section as the opening movement continues.

2. A vulcanizing mold having a pair of opposed mold sections hinged with reference to each other, and means for alternately stripping the vulcanized article from the mold sections as the mold is opened, said stripping means being automatically actuated by the movable mold section during the separation of the mold sections and being automatically disengaged from the tire after it has been stripped from the mold sections.

3. A vulcanizing mold having a relatively fixed mold section, a movable mold section hinged with reference thereto, means for holding the vulcanized article in its seat in one of the sections as the mold it initially opened, means actuated by a further opening movement of the movable mold section for shifting said holding means to strip the tire from the second mold section and thereafter disengaging the holding means from the tire, and independent means for supporting the stripped tire upon the movable mold section after the disengagement of the holding means from the tire.

4. A vulcanizing mold having a relatively fixed mold section and a movable mold section hinged at its lower edge so as to be movable outwardly and downwardly away from the fixed section and inwardly and upwardly into mating relation with said fixed section, means for prying the mold sections apart after a vulcanizing operation, means for maintaining the vulcanized article in the movable mold section during the prying operation so as to strip the tire from the fixed mold section by such operation, and means actuated by the movable mold section for automatically stripping the article from the movable mold section as its opening movement progresses.

5. In a vulcanizing mold, a pair of mold sections capable of relative separation or engagement, spaced peripheral locking members on one of the mold sections, a locking ring rotatably mounted on the other mold section, means for actuating said locking ring, and independently operable means for drawing the mold sections together when the ring is in unlocking position.

6. In a vulcanizing mold, a pair of mold sections capable of relative separation or engagement, spaced peripheral locking members on one of the mold sections, a locking ring rotatably mounted on the other mold section, means for actuating said locking ring, and independently operable means mounted on the ring for selectively drawing the mold sections together or forcing them apart when the ring is in unlocking position.

7. In a vulcanizing mold, a pair of mold sections capable of relative separation or engagement, spaced peripheral locking members on one of the mold sections, a locking ring rotatably mounted on the other mold section, means for actuating said locking ring, independently operable means including a rotatable cam for prying the two mold sections apart when the ring is in unlocking position, and a hook member carried by the cam and adapted to draw the two mold sections together when the cam is rotated in the opposite direction.

8. In a tire vulcanizing mold, a pair of opposed mold sections, relatively fixed means on one of the mold sections for loosely supporting a tire in substantially axial alignment with said mold section, and means distinct from the mold sections for automatically moving the tire axially on said fixed supporting means as the mold is opened.

9. A vulcanizing mold having a fixed mold section and a movable mold section, said mold sections being substantially upright and pivoted with reference to each other adjacent their lower edges so that the movable section may be swung outwardly and downwardly away from the fixed section and inwardly and upwardly into mating relation with said fixed section, and work stripping means mounted on one of the mold sections, said stripping means being automatically actuated by the movable mold section in its opening movement.

10. A substantially upright vulcanizing mold having a fixed mold section, a movable mold section hinged with reference thereto adjacent their lower edge so as to be movable outwardly and downwardly away from the fixed mold section and inwardly and upwardly into mating relation with said fixed section, and means mounted on the movable section and actuated thereby for automatically stripping the vulcanizing article from both the mold sections alternately as the mold is opened.

11. A tire vulcanizing mold having a fixed mold section and a movable mold section hinged at its lower edge so as to be movable outwardly and downwardly away from the fixed mold section and inwardly and upwardly into mating relation with said fixed section, and relatively fixed means mounted on the movable section for automatically engaging and registering the tire to be vulcanized between the mold sections while being closed.

12. In a vulcanizing mold, the combination of a fixed mold section, an opposed mold section movable into and out of mating relation with the fixed section, and means for automatically stripping the vulcanized article from the mold sections as the mold is opened, said means comprising a stripping member proper carried by the movable mold section, an operating lever therefor also carried by said movable mold section, and means for rocking said operating lever at a later stage in the opening movement of the movable mold section to effect the stripping of the article therefrom.

13. A vulcanizing mold as in claim 12, characterized by the fact that the stripping member and its operating lever move as a unit with the movable mold section at an early stage of its movement so as to strip the article from the fixed mold section, and that the rocking means for the operating lever act at a later stage to shift the stripping member relatively to the movable mold section so as to strip the article from the latter section.

14. In a tire vulcanizing mold, the combination of a fixed mold section, a movable mold section hinged at its lower edge so as to be movable outwardly and downwardly away from the fixed mold section and inwardly and upwardly into mating relation with said fixed section, and means for automatically stripping the tire alternately from the two mold sections as the mold is opened, said means comprising a tire engaging member carried by the hinged section, a bell-crank lever having one of its arms pivoted to the tire engaging member, and an upright link pivoted at its upper end to the other arm of said bell-crank lever and pivoted at its lower end to a fixed support.

15. A tire vulcanizing mold as in claim 14, characterized by the fact that the bell-crank lever therein referred to is shiftable bodily on its axis during the opening movement of the hinged mold section.

16. A tire vulcanizing mold as in claim 14, characterized by the fact that the tire engaging member therein referred to is provided with an extension projecting beyond its pivotal connection with the bell-crank lever, and that such extension near the end of the opening movement of the hinged mold section is adapted to be engaged and lifted by the upper end of the upright link.

17. A tire vulcanizing mold as in claim 14, characterized by the fact that the upright link therein referred to has a pin and slot connection with the bell-crank lever to permit of a limited amount of motion between them, for the purpose described.

18. In a tire vulcanizing mold, a relatively fixed mold section, a movable mold section hinged at its lower edge so as to be movable outwardly and downwardly away from the fixed mold section and inwardly and upwardly into mating relation with said fixed section, said mold sections having opposed mold cavities, means on the movable mold section for axially aligning a tire with the cavity in said section when the mold is open, and additional means for automatically moving the alined tire into the cavity of the movable mold section as the mold is closed.

19. In a tire vulcanizing mold, a relatively fixed mold section, a movable mold section hinged at its lower edge so as to be movable outwardly and downwardly away from the fixed mold section and inwardly and upwardly into mating relation with said fixed section, and a pair of tire supporting brackets mounted on the inner side of the swinging mold section, said brackets being arranged to register a tire with the cavity in the movable mold section.

20. In a tire vulcanizing mold, a pair of opposed mold sections hinged with reference to each other, means on one of the mold sections for guiding a tire to its seat, and means distinct from the mold sections for axially moving the tire with reference to said guiding means as the mold is closed.

21. In a vulcanizing mold, a pair of opposed annular mold sections capable of relative separation or engagement, a centrally disposed locking stud rotatable with reference to one of the mold sections, and locking lugs on the other mold section to cooperate with the locking stud when the two sections are in closed relation, said locking lugs and locking stud having mutually engaging portions which effect the tight drawing together of the mold sections as they are locked.

22. In a vulcanizing mold, a pair of opposed annular mold sections capable of relative separation or engagement, a centrally disposed locking stud rotatable with reference to one of the mold sections, said stud being provided with radially projecting lugs adjacent its inner end, and locking lugs on the other mold section to cooperate with the lugs on said locking stud when the two sections are in closed relation, said locking lugs having beveled surfaces adapted to be engaged by the lugs of the rotatable locking stud to draw the two sections firmly together as they are locked.

In testimony whereof, I have affixed my signature hereto.

PETER DE MATTIA.